United States Patent
Carothers et al.

(10) Patent No.: US 10,539,781 B2
(45) Date of Patent: Jan. 21, 2020

(54) COMPACT ROTATOR AND METHOD FOR MAKING A BEAM STEERING DEVICE

(71) Applicant: TEXAS INSTRUMENTS INCORPORATED, Dallas, TX (US)

(72) Inventors: Daniel N. Carothers, Lucas, TX (US); Stephen J. Fedigan, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 658 days.

(21) Appl. No.: 14/957,197

(22) Filed: Dec. 2, 2015

(65) Prior Publication Data
US 2018/0095270 A1  Apr. 5, 2018

(51) Int. Cl.
*G02B 26/08* (2006.01)
*G02B 26/10* (2006.01)
*G02F 1/29* (2006.01)
*G01D 5/14* (2006.01)

(52) U.S. Cl.
CPC ......... *G02B 26/0891* (2013.01); *G01D 5/145* (2013.01); *G02B 26/108* (2013.01); *G02F 1/292* (2013.01); *G02F 2201/58* (2013.01); *G02F 2203/24* (2013.01)

(58) Field of Classification Search
CPC ...... G02B 26/08; G02B 26/0883; G02B 5/04; F02B 26/0891
See application file for complete search history.

(56) References Cited

U.S. PATENT DOCUMENTS

| | | | | |
|---|---|---|---|---|
| 5,610,771 A | * | 3/1997 | Sigler | G02B 1/06 359/554 |
| 6,343,767 B1 | * | 2/2002 | Sparrold | F41G 7/2253 244/3.15 |
| 6,654,063 B1 | * | 11/2003 | Tadatsu | G02B 13/06 348/36 |
| 6,844,541 B2 | * | 1/2005 | Alsobrooks | G01D 5/04 250/231.13 |
| 7,236,299 B1 | * | 6/2007 | Smith | G02B 23/08 359/211.2 |
| 2007/0024978 A1 | * | 2/2007 | Jackson | G02B 5/1814 359/569 |
| 2009/0079824 A1 | * | 3/2009 | Winsor | G01S 3/7864 348/143 |

(Continued)

OTHER PUBLICATIONS

Schwarze, C. et al., "Risley-Prism Based Compact Laser Beam Steering for IRCM, Laser Communications, and Laser Radar", Critical Technology, Sep. 2005.

*Primary Examiner* — William R Alexander
*Assistant Examiner* — Balram T Parbadia
(74) *Attorney, Agent, or Firm* — Ebby Abraham; Charles A. Brill; Frank D. Cimino (57) ABSTRACT

An apparatus for a beam steering device includes a rotator constituting a cylindrical body extending along an axis and defining a central passage therethrough. A wedge-shaped prism is secured to the body within the central passage. The prism has a first surface extending perpendicular to the axis and a second surface extending transverse to the axis. A drive member is provided on one of an axial end surface and a radially outer surface of the body for rotating the rotator. An encoder member is provided on the same surface of the body as the drive member for tracking the position of the rotator.

20 Claims, 6 Drawing Sheets

(56) References Cited

U.S. PATENT DOCUMENTS

| | | | |
|---|---|---|---|
| 2011/0043880 A1* | 2/2011 | Adams | G02B 7/1805 359/221.2 |
| 2015/0062676 A1* | 3/2015 | Nito | G02B 26/122 359/198.1 |
| 2017/0139202 A1* | 5/2017 | Van Biesen | G02B 7/1828 |

* cited by examiner

COMPACT ROTATOR AND METHOD FOR MAKING A BEAM STEERING DEVICE

TECHNICAL FIELD

This disclosure relates generally to beam steering, and specifically to a compact rotator and method for making a beam steering device.

BACKGROUND

Laser technology can be used where it is desirable to determine the distance between two points. For example, LIDAR or LADAR is a remote sensing technology that measures distance by illuminating a target with a laser and analyzing the reflected light returning from the target. This technology is useful in certain automotive and gaming applications, among others. In some LIDAR systems, one or more laser sources are positioned in a housing that rotates over a prescribed angle to obtain measurements within a desired field of view. A typical LIDAR system utilizes a lot of parts and is therefore bulky, costly, and prone to breakdown.

SUMMARY

This disclosure relates generally to beam steering, and specifically to a compact rotator and method for optical beam steering.

One example provides an apparatus for a beam steering device includes a rotator constituting a cylindrical body that extends along an axis and defining a central passage therethrough. A wedge-shaped prism is secured to the body within the central passage. The prism has a first surface extending perpendicular to the axis and a second surface extending transverse to the axis. A drive member is provided on one of an axial end surface and a radially outer surface of the body for rotating the rotator. An encoder member is provided on the same surface of the body as the drive member for tracking the position of the rotator.

Another example provides an apparatus for a beam steering device having a housing with a longitudinal centerline. The apparatus includes a pair of wedge elements rotatably for mounting in the housing. Each wedge element includes a cylindrical body rotatably mounted within the housing. The body extends along an axis and defines a central passage therethrough. A wedge-shaped prism is secured to the body within the central passage has a first surface extending perpendicular to the axis and a second surface extending transverse to the axis. A drive member is provided on one of an axial end surface and a radially outer surface of the body for rotating the rotator. An encoder member is provided on the same surface of the body as the drive member for tracking the position of the rotator. The inner diameters of the central passages of the bodies can be identical.

Yet another example provides a method for making a beam steering device that includes rotatably mounting a pair of wedge elements inside a housing such that the wedge elements are free from radial overlap with each other along a centerline of the housing. Each wedge element includes a cylindrical body extending along an axis and defining a central passage. A wedge-shaped prism is secured to the body within the central passage. The prism has a first surface extending perpendicular to the axis and a second surface extending transverse to the axis. A cylindrical body rotatably mounted within the housing extends along an axis and defines a central passage therethrough. A wedge-shaped prism secured to the body within the central passage has a first surface extending perpendicular to the axis and a second surface extending transverse to the axis. A drive member is provided on one of an axial end surface and a radially outer surface of the body for rotating the rotator. An encoder member is provided on the same surface of the body as the drive member for tracking the position of the rotator. At least two drive elements are secured to the housing for cooperating with the drive member to rotate the prism about the axis. At least one encoder sensor is secured to the housing for cooperating with the encoder member to sense the rotational position of the prism about the axis.

DETAILED DESCRIPTION

Figure 1:
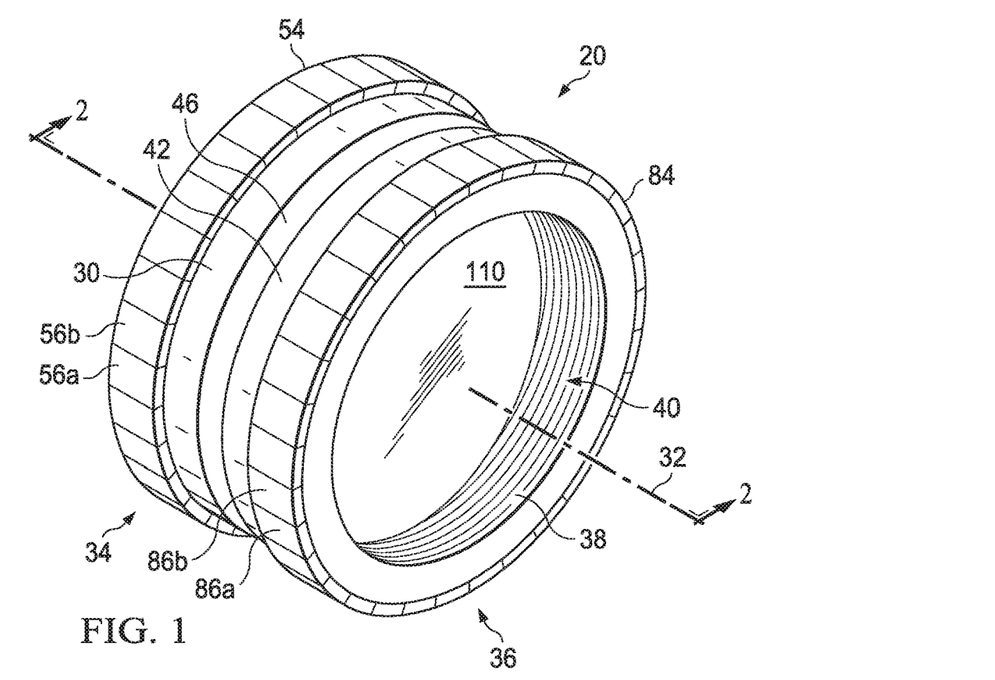
FIG. 1 illustrates an example wedge element.
Figure 2:
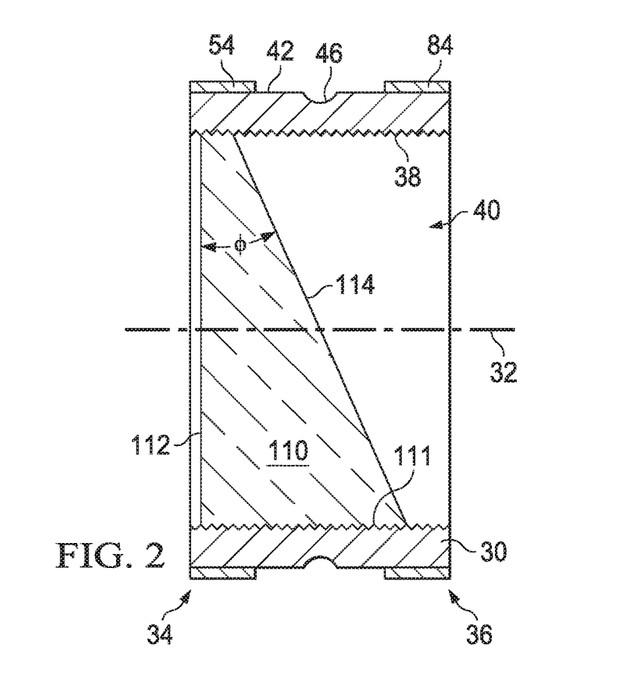
FIG. 2 illustrates a section view of the wedge element of FIG. 1 taken along line 2-2.

This disclosure relates generally to beam steering, and specifically to a compact rotator and method for making a beam steering device. FIGS. 1 and 2 illustrate a rotator constituting a wedge element 20. The wedge element 20 includes a cylindrical body 30 that extends along an axis 32 from a first end 34 to a second end 36. The body 30 includes an inner surface 38 that defines a passage 40 extending along the axis 32 entirely through the body 30. The body 30 also includes a radially outer surface 42 extending about the axis 32 to define the circumference of the body.

The wedge element 20 includes a drive member 54 and an encoder member 84 provided on the outer surface 42 and extending around the entire circumference of the body 30. The drive member 54 is positioned at the first end 34 of the body 30 and is used to help rotate the wedge element about the axis 32. To this end, the drive member 54 can constitute a magnetic strip with alternating north and south poles secured to or embedded in the outer surface 42. This outer surface 42 can be made from a stack of bonded ferromagnetic laminations to efficiently conduct the flux from inner radial north to inner radial south poles. However, if efficiency is not a concern, the laminations could be replaced by a solid piece of ferromagnetic material or the ferromagnetic material could be eliminated entirely. In this construction, the drive member 54 includes a series of alternating magnets 56a, 56b phased 180° from one another. Alternatively, the drive member 54 can constitute a series of radially extending teeth formed into the outer surface 42 of the body 30 (not shown).

The encoder member 84 is positioned at the second end 36 of the body 30 and helps determine and track the rotational position of the wedge element 20 about the axis 32. To this end, the encoder member 84 can constitute a magnetic strip secured to or embedded in the outer surface 42. In this construction, the encoder member 84 includes two tracks: an index track with either a north or south pole on the outer radius of the magnetic strip and a incremental track constituting a series of alternating magnets 86*a*, 86*b* phased 180° from one another. The index track is needed to provide an absolute reference position and generates one pulse per revolution (PPR) whereas the incremental track generates $N_p$ PPR, where $N_p$ is the number of poles along the strip circumference. Alternatively, the encoder member 84 can constitute a series of radially extending teeth formed into the outer surface 42 of the body 30 (not shown). To form two tracks in this case, one of the teeth would be extended longitudinally to create an index track.

Figure 3:
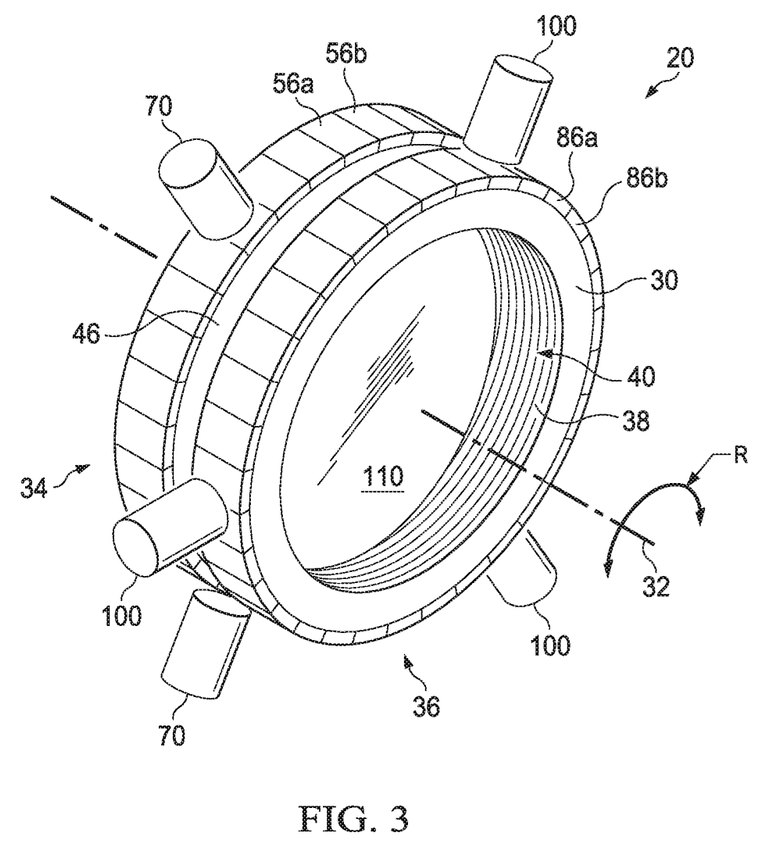
FIG. 3 illustrates an isometric view of the wedge element of FIG. 1 in proximity with drive elements and sensors.
Figure 4A:
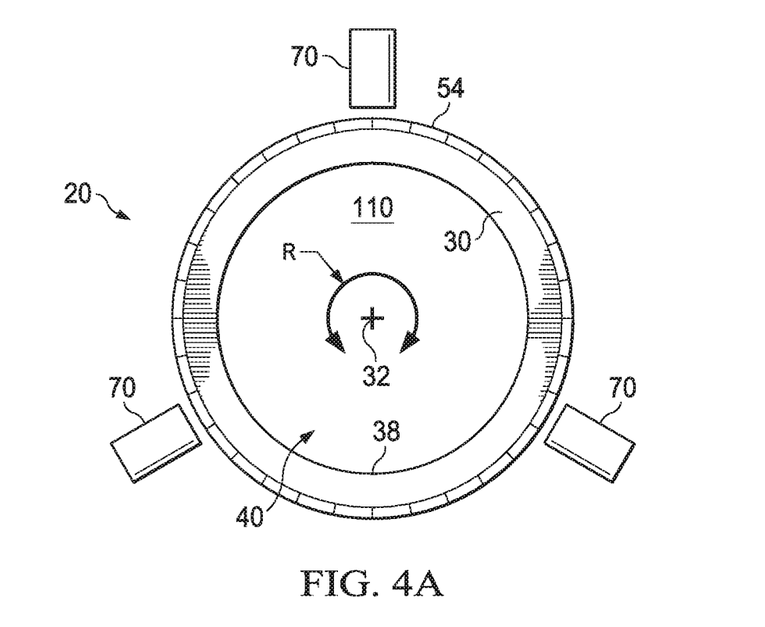
FIG. 4A illustrates one example drive element configuration for the wedge element.
Figure 4B:
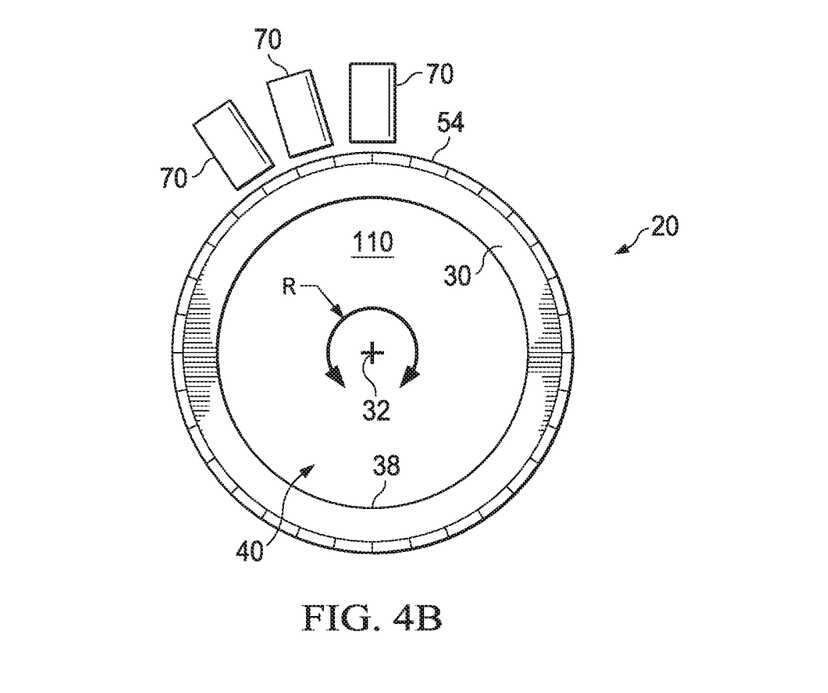
FIG. 4B illustrates another example drive element configuration for the wedge element.

Referring to FIG. 3, at least one drive element 70 is provided that cooperates with the drive member 54 to rotate the wedge element 20 about the axis 32 in the direction indicated generally by the arrow R. When the drive member 54 is a magnetic strip, the drive elements 70 constitute a plurality of magnetic drive coils arranged about the circumference of the wedge element 20 radially outward of the drive member 54. As shown, three drive coils 70 are provided and can be symmetrically spaced (FIG. 4A) or asymmetrically spaced (FIG. 4B) about the circumference of the wedge element 20. Although three drive coils 70 are illustrated, in other examples, more or fewer drive coils can be used to rotate the wedge element 20. Typically, the drive coils 70 would be wrapped around a bonded ferromagnetic lamination stack which would have poles and a backiron to efficiency "conduct" the stator flux. In some examples, at least two drive coils 70 can be used to start reliable rotation in a given direction. In other examples, at least three drive coils 70 can be used to enable starting reliable rotation in both the clockwise and counterclockwise directions.

When the drive member 54 is formed from teeth the drive elements 70 constitute motor-driven gears or belt drives (not shown) that engage the encoder member teeth for rotating the wedge element. In this configuration, the wedge element 20 can be designed to rotate in only one direction R about the axis 32 or in both directions about the axis.

While the examples disclosed herein describe the drive elements 70 and drive members 54 as constituting motors that include permanent magnets or teeth on their rotors, other types of motors could be utilized. For example, motors could be implemented as switched reluctance motors or brushless DC motors. In such alternative examples, the encoder sensor and controls would be appropriately modified to operate the motors accordingly.

Referring to FIG. 3, an encoder sensor 100 is provided to cooperate with the encoder member 84 to sense the rotational position of the wedge element 20 about the axis 32. For instance, the encoder sensor can include a plurality (e.g., three sensors). In one example, the encoder member 84 acts as an encoder track and provides incremental and/or absolute encoding of the wedge element 20 position by cooperating with the sensor 100.

When the encoder member 84 is a magnetic strip, the sensors 100 constitute magnetic poles arranged about the circumference of the wedge element 20 radially outward of the encoder member 84. The magnetic sensors 100 can be, for example, a magneto-resistive or Hall Effect sensor. As shown, three sensors 100 ($S_a$, $S_b$, and $S_i$ configured ½ a pole pitch apart from one another, with $S_i$ coinciding with $S_a$) are provided that are symmetrically spaced about the circumference of the wedge element 20. Alternatively, the sensors 100 can be asymmetrically spaced (not shown) about the circumference of the wedge element 20. On the other hand, when the encoder member 84 is formed from teeth the sensors 100 are inductive sensors (not shown) that track tooth movement to determine the rotational position of the wedge element 20 about the axis 32. In any case, although three sensors 100 are illustrated in this example, in other examples, more or fewer sensors can be implemented to sense the rotational position of the wedge element 20.

It will be appreciated that although two separate members 54, 84 are shown the members 54, 84 could alternatively be formed as a single element secured to or formed integrally with the body 30. In this construction, the single element could have a collective width equal to the width of the drive and encoder members 54, 84 along the length of the body 30. The single element need only be wide enough in the direction of the axis 32 to allow both drive elements 70 and sensors 100 to simultaneously interact with the encoder member.

An annular groove 46 is provided between the members 54, 84. In one example, the annular groove 46 is positioned at the longitudinal center of the body 30. The annular groove 46 extends along the entire circumference of the body 30 and acts as a bearing track for receiving bearings 216 positioned within the housing 22 (see FIG. 5).

Referring to FIG. 2, a wedge-shaped prism 110 is provided in the passage 40 of the body 30 and is secured to the inner surface 38. The prism 110 includes a first surface 112 and a second surface 114. Each of the first and second surfaces 112, 114 can be planar, arcuate, conical, hemispherical or any other known prism 110 shape. As shown, both of the surfaces 112, 114 are planar. The first and second surfaces 112, 114 extend at an angle $\Phi$ relative to one another.

The prism 110 can be secured to the inner surface 38 in a variety of ways. For example, the prism 110 can be threaded to the inner surface 38, indicated at 111, and/or be retained in a recess formed in the inner surface by a retaining ring, set screw or adhesive (not shown). Regardless, the prism 110 is secured to the body 30 so as to be rotatable therewith. In any case, the prism 110 is oriented within the passage 40 such that the first surface 112 extends perpendicular to the axis 32 and the second surface 114 extends transverse to the axis. The first surface 112 can be positioned either at the first end 34 of the body 30 (as shown) or at the second end 36 (not shown). Moreover, since the same bodies 30 are used for each wedge element 20 the inner diameters of the central passages 40 receiving the prisms 110 are the same.

Figure 5:
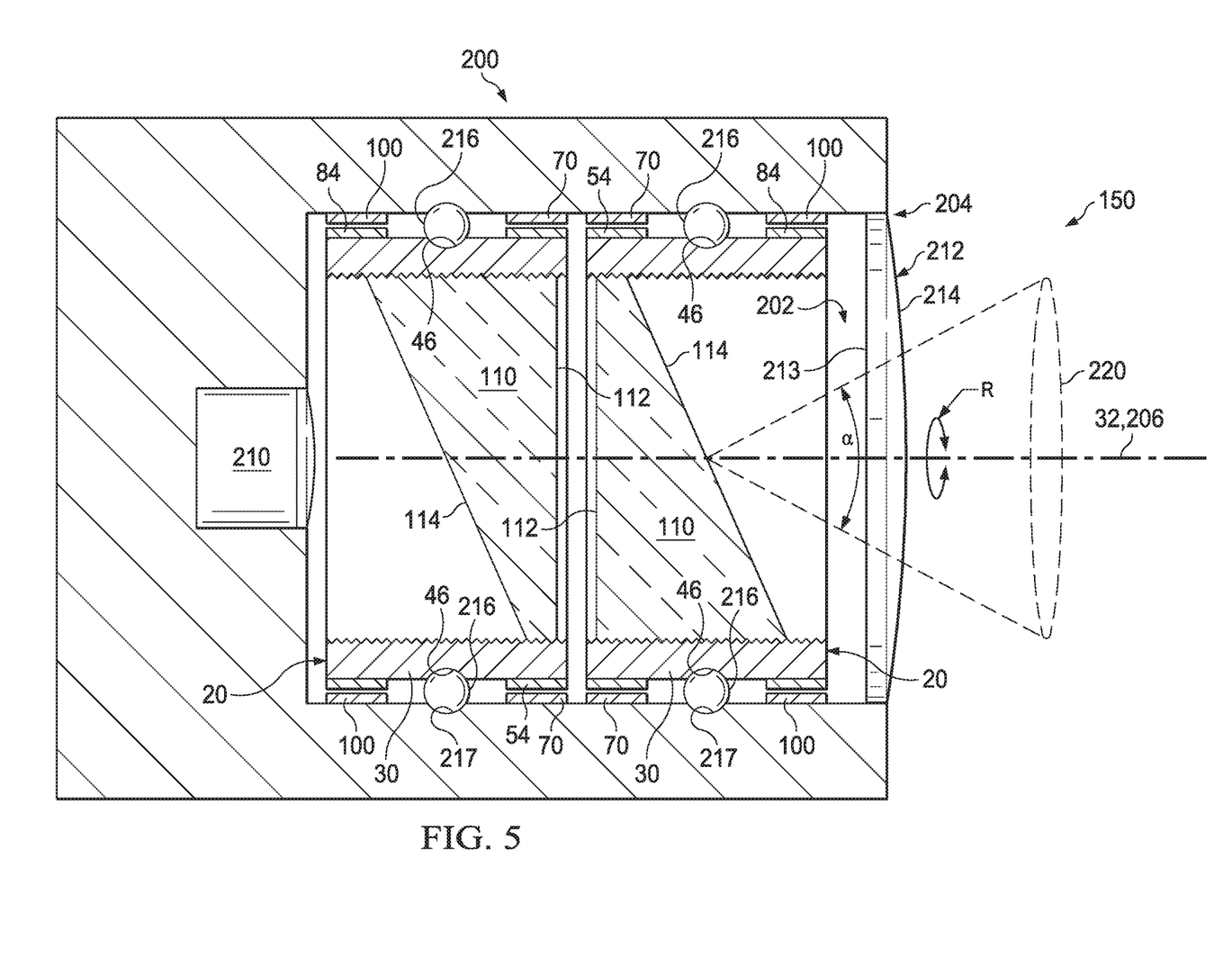
FIG. 5 illustrates a beam steering device that includes multiple wedge elements.

Referring to FIG. 5, the wedge element 20 is used in a beam steering device 150 that emits and receives laser light in order to determine distances to objects spaced from the device. In one example shown schematically in FIG. 5, the beam steering device 150 includes a pair of wedge elements 20 provided in a housing 200. The housing 200 includes a cavity 202 that extends along a centerline 206 to an opening 204 in the housing.

The pair of wedge elements 20 are rotatably mounted in the cavity 202, with the axes 32 of the bodies 30 being coaxial with the centerline 206, i.e., the wedge elements are axially aligned along the centerline. The wedge elements 20 are also spaced entirely from one another in both the axial and radial directions along the centerline 206. No portion of one wedge element 20 radially overlaps a portion of the other wedge element 20. In other words, both ends 24, 26 of the rightmost wedge element 20 (as shown in FIG. 5) are positioned closer to the opening 204 than both ends 24, 26 of the leftmost wedge element 20. The wedge elements 20 therefore do not rotate within one another in use.

The bearings 216 are provided radially between an annular groove 217 in the inner wall of the housing 200 and the grooves 46 in the bodies 30. The bearings 216 help support the wedge element 20 for rotation relative to the housing 22 about the axis 32.

The drive coils 70 and sensors 100 are secured to the housing 200 radially outward of the wedge elements 20. The drive coils 70 and sensors 200 associated with each wedge element 20 are radially aligned with the respective drive members 54 and encoder members 84.

A camera 210 is provided in the housing 200 at the end of the cavity 202 opposite the opening 204 and aligned along the centerline 206. The camera 210 emits laser light generally along the centerline 206. A collimating lens 212 is provided in the opening 204 along the centerline 202. The lens 212 includes a first surface 213 and a second surface 214. Each of the first and second surfaces 213, 214 can be planar, arcuate, conical, hemispherical or any other known lens shape. As shown, the first surface 213 is planar and extends perpendicular to the centerline 206. The second surface 214 is curved outward relative to the housing 200.

In operation, beam light from the camera 210 passes through the prisms 110 and out of the opening 204 through the lens 212. The drive elements 70 positioned about each wedge element 20 can be actuated/energized in order to rotate one or both wedge elements about the axes 32 and centerline 206 in the direction R. This results in rotation of the prisms 110 in the direction R, which changes the orientation of one or both second surfaces 114 on the prisms 110 relative to the beam path through the housing 200. The first surfaces 112 are always perpendicular to the centerline 206 regardless of the rotational position of the prisms 110. The prisms 110 can be rotated to a number of different positions relative to each other sufficient to generate a field of view for the beam steering device 200, illustrated by the cone 220 in FIG. 5. In one instance, the cone 220 extends over an angle α of about 20°. The beam steering device 150 can therefore capture and measure objects within the viewing cone 220.

Rotating each wedge element 20 adjusts the angle at which the laser light exits the respective wedge element. The wedge elements 20 can be rotated in any desired manner, e.g., individually, simultaneously, in the same direction, in opposite directions, etc., to achieve the desired light trajectory. Rotating one wedge element 20 in relation to the other will change the direction of the beam. When the prisms 110 angle in the same direction, the angle of the refracted beam becomes greater. When the prisms 110 are rotated in the direction R to angle in opposite directions, they cancel each other out, and the beam is allowed to pass straight through the prisms in a direction extending along/parallel to the centerline 206. During rotation, the axially aligned orientation of the wedge elements 20 results in the first or leftmost prism 110 directing the light from the camera 210 along one axis and the second or rightmost prism 102 directing the light from the camera along another axis. Consequently, the multiple wedge elements 20 produce a two-dimensional scanning pattern.

The bearings 216 between the housing 200 and wedge elements 20 help stabilize and center the wedge element 20 during rotation in the direction R to prevent inaccurate positioning thereof. When the drive coils 70 start and stop rotation of the wedge elements 20, there is a tendency for the wedge element to jerk, oscillate or wiggle. This negatively affects beam steering accuracy and, thus, it is desirable to ensure the wedge element 20 rotates with minimal oscillation. Consequently, the annular grooves 46, 217 and bearings 216 cooperate to maintain beam steering accuracy from the wedge element 20.

While the prisms 110 are rotated, the sensors 100 track rotational movement of the encoder members 84. The position can be absolute or relative but, in any case, the precise location of each prism 110 about the centerline 206 is known. The sensors 100 and drive elements 70 are in constant communication with one another via a computer (not shown) or the like. Consequently, the rotational position of each prism 110 can be precisely controlled and maintained during operation of the beam steering device 150.

The drive coils 70 and magnets 56a, 56b allow the prisms 110 to be rotated in the direction R in a microstep fashion. The resolution of this rotation is tied directly to pole pitch (mechanical spacing between the north and south pole centers) of the magnets 56a, 56b, e.g., the smaller and closer together the magnets, the more precise the rotational positioning of the prism 110.

Figures 6, 7A, 7B:
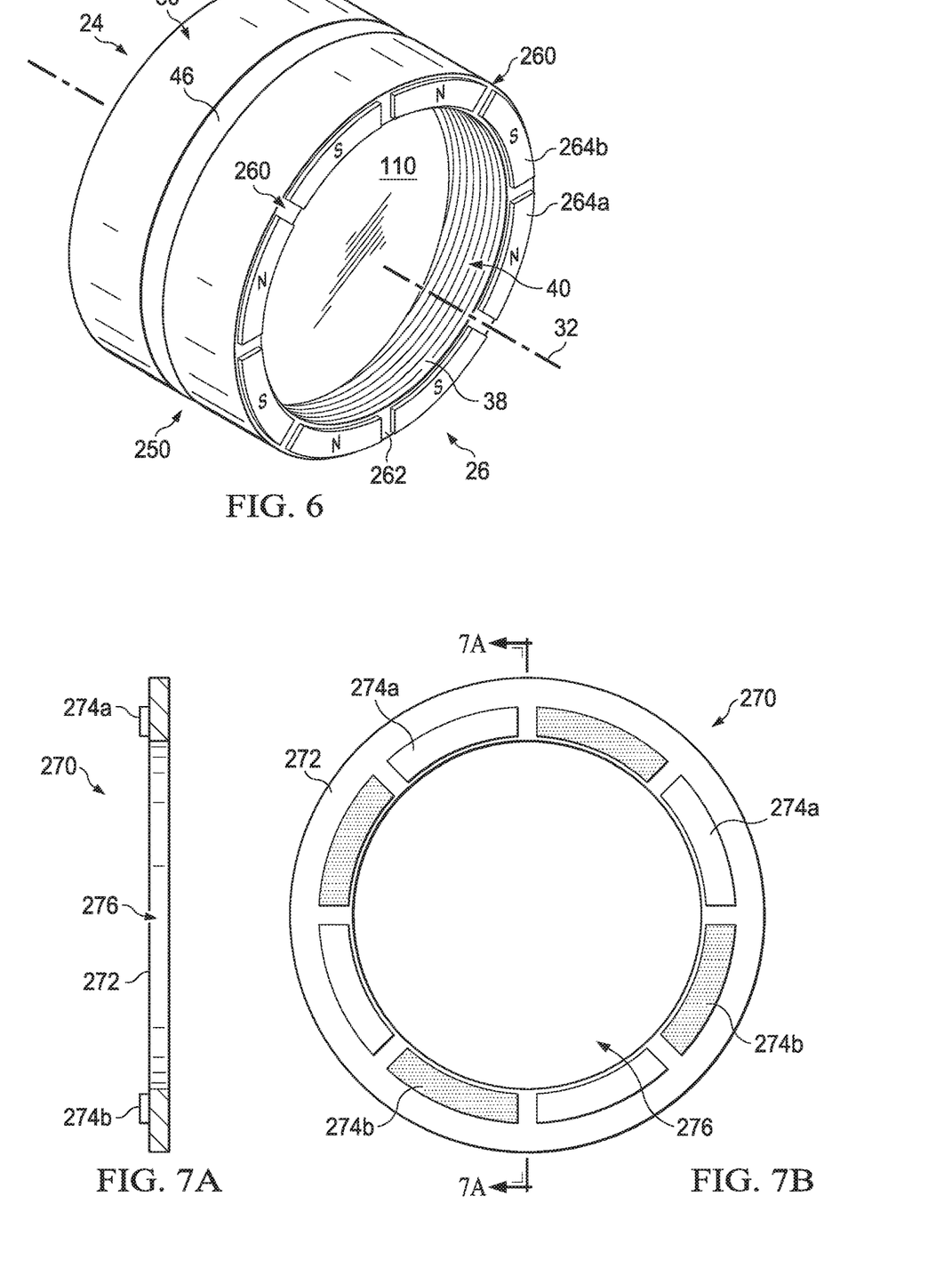
FIG. 6 illustrates another example drive element configuration for the wedge element.
FIG. 7A illustrates a side view of a PCB associated with the drive element of FIG. 6.
FIG. 7B illustrates a front view of the PCB of FIG. 7A.
Figure 8:
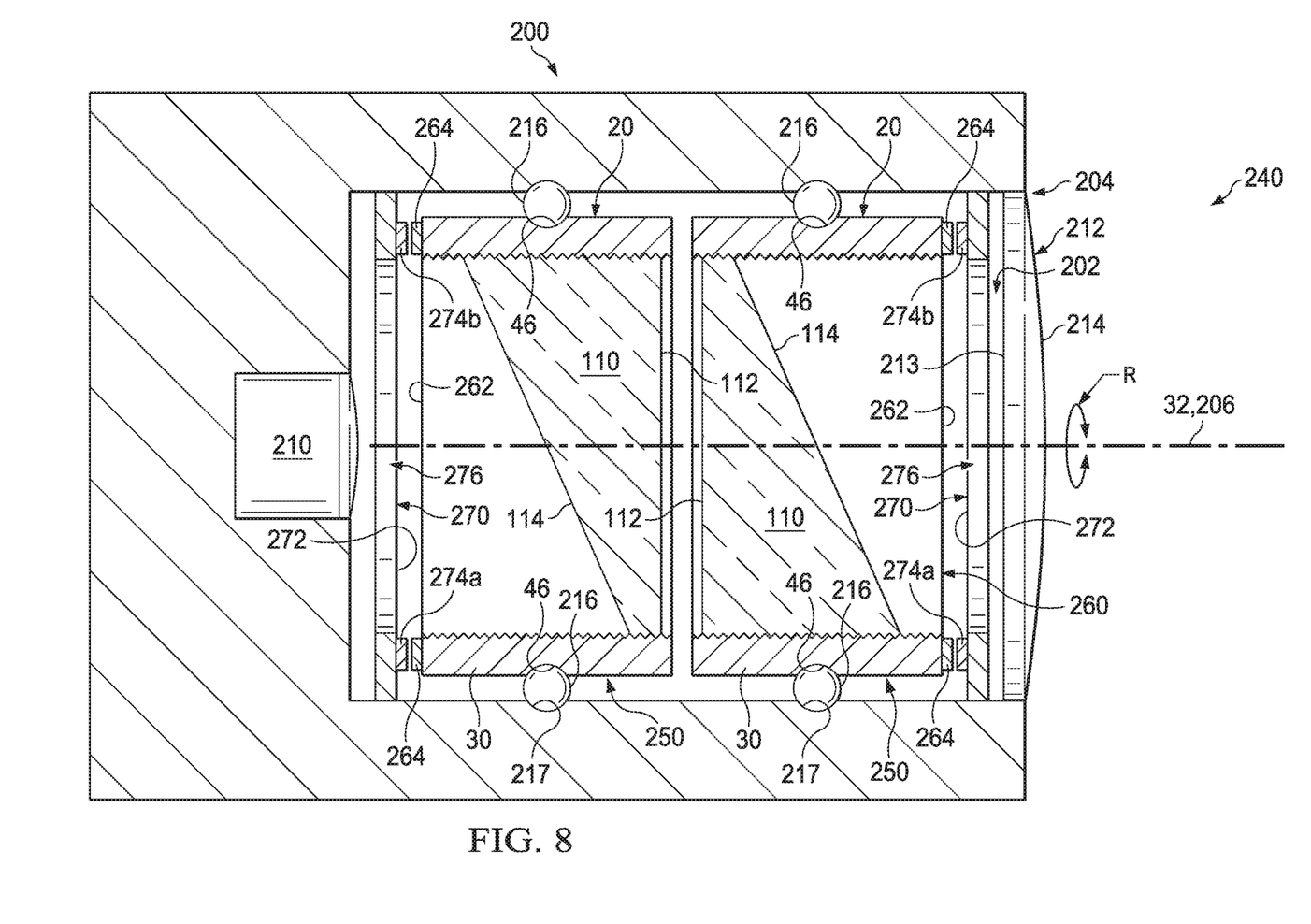
FIG. 8 illustrates a beam steering device that includes multiple wedge elements having the drive element configuration of FIG. 6.

FIGS. 6-8 illustrate another example wedge element 250. Features in FIGS. 6-8 that are identical to features are FIGS. 1-5 are given the same reference number. In this configuration for the wedge element 250, the drive member 260 is positioned on an outer surface 262 of the body 30 at one of the ends 24, 26. As shown in FIG. 6, the outer surface 262 is the axial end surface of the second end 26 of the body 30 extending substantially perpendicular to the axis 32. The drive member 260 constitutes a series of alternating magnets 264a, 264b phased 180° from one another. The magnets 264a, 264b are arranged in a circumferential pattern about the passage 40. The magnets 264a, 264b can be integrally formed on the outer surface 262 or secured to a strip or base member secured to the outer surface (not shown).

The drive member 260 cooperates with a PCB 270 secured to the housing 200 within the cavity 202. The PCB 270 has an annular shape with a central opening 276 aligned with the passages 40 for allowing beam light to pass therethrough in an unobstructed manner. The PCB 270 includes a plurality of magnetic drive coils 274a, 274b. The drive coils 274a, 274b are arranged in a circumferential pattern about the opening 276. The drive coils 274a, 274b can be integrally formed on the PCB 270, e.g., via printing, or secured to a strip or base member secured to the PCB (not shown). As shown, the drive coils 274a, 274b are integrally formed into a surface 272 of the PCB 270.

FIG. 8 illustrates a beam steering device 240 in which a pair of wedge elements 250 are provided. Similar to the beam steering device 150, the wedge elements 250 in the beam steering device 240 are also spaced entirely in both the axial and radial direction from one another along the centerline 206. No portion of one wedge element 250 radially overlaps a portion of the other wedge element 250. In other words, both ends 24, 26 of the rightmost wedge element 250 (as shown in FIG. 8) are positioned closer to the opening 204 than both ends 24, 26 of the leftmost wedge element 250. The wedge elements 250 therefore do not rotate within one another in use. Moreover, since the same bodies 30 are used for each wedge element 250 the inner diameters of the central passages 40 receiving the prisms 110 are the same.

The wedge elements 250 are oriented in the cavity 202 such that the outer surfaces 262 face in opposite directions. A PCB 270 associated with the leftmost wedge element 250 is secured to the housing 200 between that wedge element and the camera 210 with the surface 272 facing the outer surface 262. A PCB 270 associated with the rightmost wedge element 250 is secured to the housing 200 between that wedge element and the lens 212 with the surface 272 facing the outer surface 262. Both PCBs 270 are spaced axially from their respective wedge element 250 and the openings 276 are centered on the centerline 206. During operation, the drive coils 274a, 274b on one or both PCBs 270 are energized to rotate the respective wedge element(s) 250 in the direction R to the desired positions about the centerline 206.

The PCBs 270 can be configured to include a position sensing structure, such as the position sensors 100, to sense rotation of the drive members 260. This position sensing structure can sense rotation of the magnets 264a, 264b on the body 30 or other encoding structure provided on the outer surface 262 (not shown). Alternatively, the second encoding member 84 and sensors 100 previously described can be used on the outer surface 42 of the body 30 (not shown).

Referring to FIG. 8, the wedge elements 250 are rotatably mounted in the housing 200 by the aforementioned bearings 216 radially between the bodies 30 and the wall of the housing. Alternatively, the surfaces 272 of the PCBs 270 and the surfaces 262 of the bodies 30 can be modified to include bearing races to receive bearings such that the wedge elements 250 are axially supported for rotation in the housing 200 (not shown). In this construction, the axial end faces of the wedge elements 250 facing each other would also be provided with bearing tracks to allow bearings to extend between and connect the wedge elements to one another (also not shown). Such a configuration would allow the housing 200 to be reduced as a smaller radial clearance between the wedge elements 250 and inner housing wall would be needed for the axially mounted bearings.

The wedge elements disclosed herein are advantageous in that they produce a two-dimensional scanning pattern, compared to line scans common in many other devices. Furthermore, by positioning both the drive and position sensing structure on the same outer surface of the device, i.e., both on the outer circumferential surface or both on the outer axial surface, the wedge elements disclosed herein can be made more compact and efficient than other devices, for example, providing a space reduction of about ⅔ to about ¾ over such devices. This advantage is further realized by the non-overlapping positioning of the wedge elements within the housing.

These configurations also reduce the number of moving components and can eliminate the use of gears to drive the wedge elements, thereby reducing the packing complexity and simplifying the design. In other words, building the drive system around the body that retains the wedge reduces the footprint and complexity of the wedge element, which allows it to be adapted/sized for a wide range of applications, e.g., automotive LIDAR, occupancy sensing, and gaming. The wedge elements disclosed herein are also advantageous in that the same component, namely the camera, e.g., photodetector, is used to both emit and detect the laser light.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. An apparatus for a beam steering device, comprising:
   a rotator comprising a cylindrical body extending along an axis and defining a central passage;
   a wedge-shaped prism secured to the body within the central passage, the wedge-shaped prism having a first surface extending perpendicular to the axis and a second surface extending transverse to the axis;
   a drive member for rotating the rotator and provided on one of an axial end surface and a radially outer surface of the cylindrical body;
   an encoder member for tracking a position of the rotator and provided on the same surface of the cylindrical body as the drive member; and
   an annular groove positioned between the drive member and the encoder member, the annular groove provided on the same surface of the cylindrical body as the drive member and the encoder member.

2. The apparatus recited in claim 1, wherein the drive member comprises a plurality of alternating magnetic poles.

3. The apparatus recited in claim 1, wherein the encoder member comprises a strip of magnetic elements.

4. The apparatus recited in claim 1, wherein the drive member and the encoder member are integrally formed as one piece.

5. The apparatus recited in claim 1, wherein at least one of the encoder member and the drive member comprises a plurality of teeth formed on the radially outer surface of the body.

6. The apparatus recited in claim 1, wherein the drive member comprises an annular array of magnetic poles provided on the axial end surface about the passage, the magnetic poles acting as the encoder member for tracking the position of the rotator.

7. The apparatus recited in claim 1, wherein the rotator is a first rotator; and
   the apparatus further comprising a second rotator for the beam steering device, the second rotator comprising:
   a second cylindrical body extending along a second axis and defining a second central passage;
   a second wedge-shaped prism secured to the body within the second central passage, the second wedge-shaped prism having a first surface extending perpendicular to the second axis and a second surface extending transverse to the second axis;
   a second drive member for rotating the rotator and provided on one of an axial end surface and a radially outer surface of the second cylindrical body; and
   a second encoder member for tracking the position of the rotator and provided on the same surface of the second cylindrical body as the second drive member,
   wherein the inner diameters of the central passages of the bodies of the first and second rotators are identical.

8. The apparatus recited in claim 7, wherein the wedge-shaped prism of the first rotator and the wedge-shaped prism of the second rotator are free from radial overlap with each other along the axis when mounted in a housing of the beam steering device.

9. An apparatus for a beam steering device having a housing with a longitudinal centerline, comprising:

a pair of rotators rotatably for mounting in the housing, each including:
- a cylindrical body rotatably mounted within the housing, the body extending along an axis and defining a central passage;
- a wedge-shaped prism secured to the body within the central passage, the wedge-shaped prism having a first surface extending perpendicular to the axis and a second surface extending transverse to the axis;
- a drive member for rotating the rotator and provided on one of an axial end surface and a radially outer surface of the body;
- an encoder member for tracking a position of the rotator and provided on the same surface of the body as the drive member; and
- an annular groove positioned between the drive member and the encoder member, the annular groove provided on the same surface of the cylindrical body as the drive member and the encoder member, wherein the inner diameters of the central passages of the bodies are identical.

10. The apparatus recited in claim 9, wherein the wedge-shaped prisms of the pair of rotators are free from radial overlap with each other along the axis when mounted in the housing.

11. The apparatus recited in claim 9, wherein the prisms are individually rotatable to steer beams through the housing.

12. The apparatus recited in claim 9, wherein the drive member comprises a plurality of alternating magnetic poles.

13. The apparatus recited in claim 12, wherein the magnetic poles are arranged on the radially outer surface of the body.

14. The apparatus recited in claim 9, wherein the drive member and the encoder member are integrally formed as one piece.

15. The apparatus recited in claim 9, wherein at least one of the encoder member and the drive member comprises a plurality of teeth formed on the radially outer surface of the body.

16. The apparatus recited in claim 9, wherein the encoder member comprises a strip of magnetic elements.

17. The apparatus recited in claim 9, wherein the drive member comprises an annular array of magnetic poles provided on the axial end surface about the passage.

18. The apparatus recited in claim 17, wherein the magnetic poles are utilized as the encoder member to enable sensing the position of the rotator.

19. A method for making a beam steering device comprising:
rotatably mounting a pair of rotators inside a housing such that a wedge-shaped prism for each rotator in the pair of rotators are disposed coaxially and free from radial overlap with respect to each other within the housing, each wedge element comprising:
- a cylindrical body extending along an axis and defining a central passage;
- a wedge-shaped prism secured to the body within the central passage, the wedge-shaped prism having a first surface extending perpendicular to the axis and a second surface extending transverse to the axis;
- a drive member for rotating the rotator and provided on one of an axial end surface and a radially outer surface of the cylindrical body;
- an encoder member for tracking a position of the rotator and provided on the same surface of the cylindrical body as the drive member; and
- an annular groove positioned between the drive member and the encoder member, the annular groove provided on the same surface of the cylindrical body as the drive member and the encoder member;

securing drive elements to the housing for cooperating with each drive member to rotate the prism about the axis; and securing at least one encoder sensor to the housing for cooperating with the encoder member to sense the rotational position of the prism.

20. The method of claim 19, wherein the inner diameter of the central passage of each respective body of the first and second rotators are substantially identical.

* * * * *